March 30, 1954     E. LAVERDISSE     2,673,424
APPARATUS FOR SURFACING GLASS SHEETS
Filed Dec. 4, 1951     3 Sheets-Sheet 1

INVENTOR
EDMOND LAVERDISSE
BY:
Hazeltine, Lake & Co.
AGENTS

March 30, 1954

E. LAVERDISSE 2,673,424

APPARATUS FOR SURFACING GLASS SHEETS

Filed Dec. 4, 1951

INVENTOR
EDMOND LAVERDISSE
By:
Haseltine, Lake & Co.
AGENTS

March 30, 1954  E. LAVERDISSE  2,673,424
APPARATUS FOR SURFACING GLASS SHEETS
Filed Dec. 4, 1951
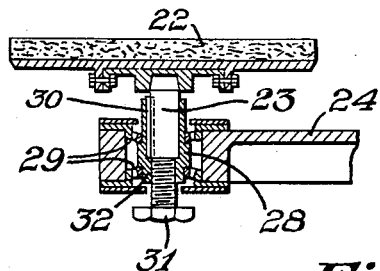
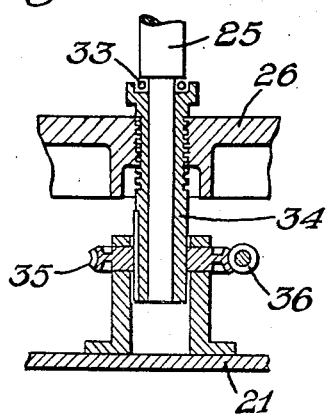
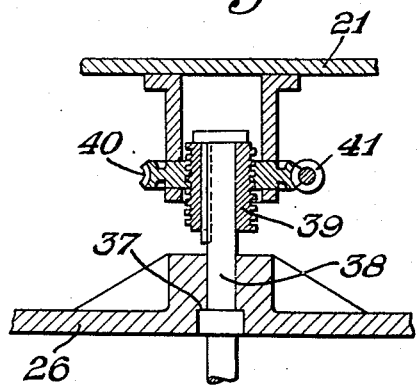
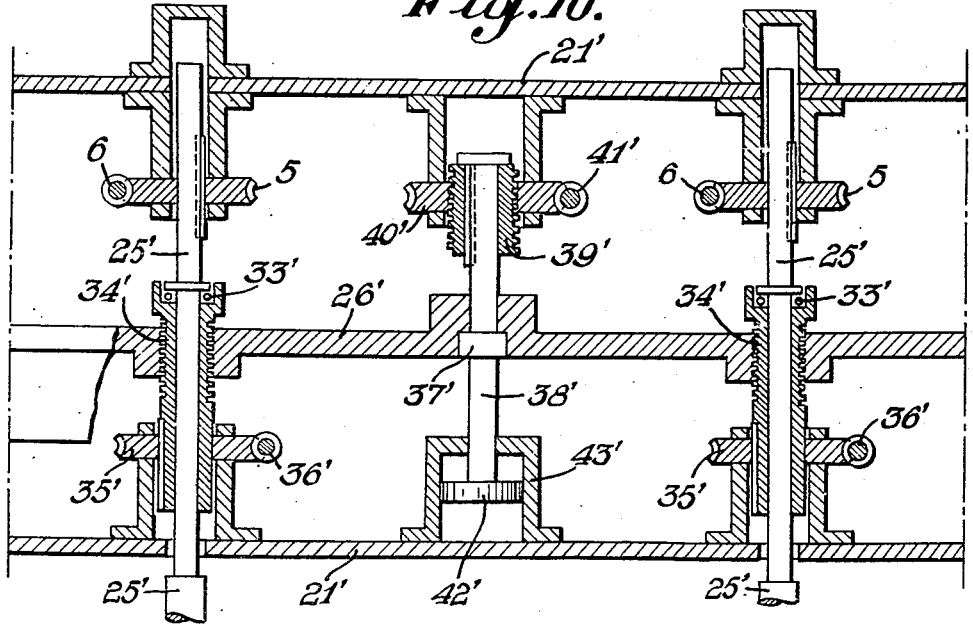

Patented Mar. 30, 1954

2,673,424

UNITED STATES PATENT OFFICE 2,673,424

APPARATUS FOR SURFACING GLASS SHEETS

Edmond Laverdisse, Auvelais, Belgium, assignor to Les Glaceries De La Sambre, Societe Anonyme, Auvelais, Belgium, a Belgian company Application December 4, 1951, Serial No. 259,801

Claims priority, application Belgium December 9, 1950

6 Claims. (Cl. 51—112)

This invention relates to the mounting of tools for grinding glass or glass grinding discs and tools for polishing glass or glass polishers. It relates more particularly to machines in which these tools are carried by beams arranged above and below the glass sheet in order to act successively on both sides thereof, or arranged in pairs to act simultaneously on both sides of the glass.

It is important in either case that the tools will be correctly applied on the surface of the glass and, consequently that their working faces be located exactly at the same level and parallel to the glass sheet in order to avoid localisation of undue stresses. It is also desirable that as the tools become worn, the wear may be compensated not only by an individual adjustment of each tool but also by simultaneous adjustment of a plurality of tools, this being of particular importance with the tools located under the glass sheet which they assist in supporting. The difficulties encountered hitherto in meeting these conditions have been frequently a cause for breakage.

The object of this invention is to overcome these difficulties and, in accordance with the invention rotary working tools mounted singly or in groups in carrying beams extending below and/or above a moving sheet of glass sheet are carried and driven by vertical shafts mounted in the beams in such manner that any of said shafts may be adjusted vertically either separately, or simultaneously with the other shafts on the same beam.

In one embodiment of the invention each vertical shaft comprises two sections, one of which is controlled by a worm in unison with the corresponding sections of the other shaft, the second section carrying the tool and being controlled by a sleeve for the individual adjustment of the tool.

In another embodiment of the invention each vertical shaft rests on a cross member adapted to be reciprocated in guides secured to the beam.

A double adjustment is also provided when groups of tools are mounted on the arm of a support revolving about a central shaft. Each tool is then adjustable individually and the shaft carrying the support is also vertically adjustable. When two or more such supports are mounted in one beam, their simultaneous adjustment may furthermore be obtained by supporting their shafts on an adjustable cross member or by adjusting the beam itself.

In order that the tools will always bear with their whole surface against the glass, flexible members such as elastic rings are preferably interposed between the tools and their carrying shafts.

These and further features of the invention will be described hereafter with reference to the accompanying drawings in which:

Figs. 7, 8 and 9 are detail views in elevation.

Figure 10 is a side elevational view, partly in section, showing an upper beam fitted with a revolving tool-carrying support.

Figure 1:
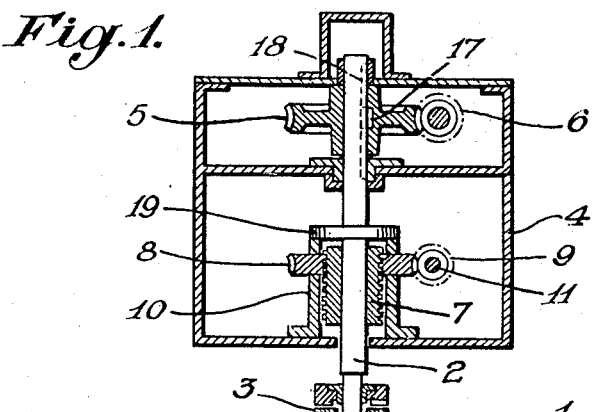
Figs. 1 and 2 are cross-sectional elevations respectively illustrating an upper beam and a lower beam.

The working tool 1, for example a polishing tool of disc shape, shown in Fig. 1 is mounted on a vertical shaft 2 with interposition of a ring of rubber or other elastic material 3, permitting of a slight angular movement of the tool relatively to the horizontal, when this is necessary in order to apply the surface of the tool 1 exactly on the surface of the glass sheet. The shaft 2 mounted in the beam 4 is rotated, during the operation of the machine, by a helical wheel 5 driven by a worm 6, the wheel 5 being fitted with a key 17 slidably engaging a groove 18 in the shaft 2, thereby permitting vertical movement of the shaft 2 in the wheel 5.

The shaft 2 is rigidly connected with a collar 19 and is adapted to slide in a threaded sleeve 7. Said sleeve engages the internally threaded hub of a helical wheel 8 which in turn is in driving engagement with a worm 9, and is locked against vertical motion by a support 10. Rotation of the worm 9 will therefore either cause the shaft 2 to be lifted with the tool 1, through the sleeve 7 and collar 19, or it will allow the shaft and the tool to move downwards by gravity.

The worm 9 is mounted on a shaft 11 which carries similar worms 9, one for each shaft 2 in the beam 4 (Fig. 3), whereby simultaneous adjustment of all the tools carried by the beam can be controlled by means of a handwheel 12 secured on the shaft 11.

Figure 2:
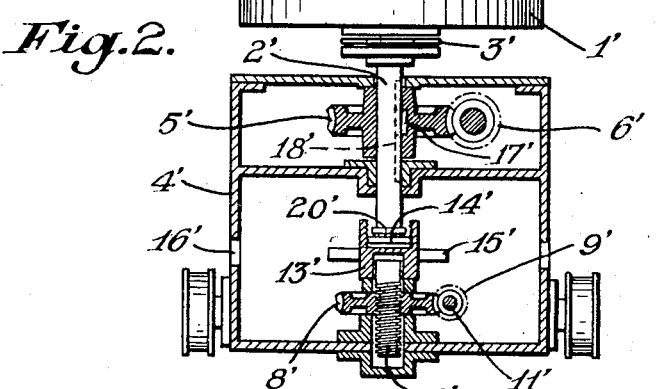

Each lower tool 1' (Fig. 2) is also mounted on its shaft 2' by means of an elastic ring 3'. The shaft 2' is supported in the lower beam 4' so that it can be adjusted vertically both individually and together with the other shafts 2'. To that end, between the shaft 2' and a vertically adjustable screw 7' engaged by a helical wheel 8' controlled by a worm 9', there is interposed a sleeve 13' whose upper internally threaded end is engaged by a threaded bearing block 14' on which the lower end of shaft 2' rests through the medium of a ball bearing 20'. The sleeve 13' may be rotated manually by means of handles 15' accessible through apertures 16' in the sides of the beam 4'.

Figure 4:
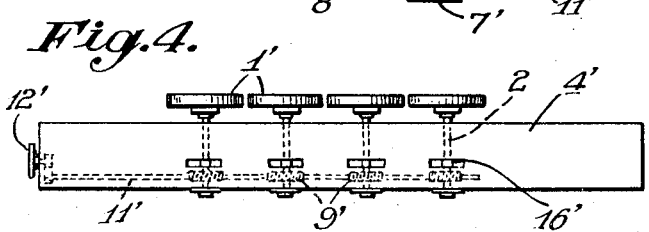

Vertical adjustment of each tool 1' may thus be operated manually by means of the handles 15', while simultaneous adjustment of all the tools 1' in the beam may be effected by means of the worms 9' on shaft 11' controlled by the handwheel 12' (Fig. 4).

As in the upper beam, each tool carrying shaft is rotated by a helical wheel herein shown at 5' and driven by a worm 6', a key 17' engaged in a vertical groove in the shaft 2' allowing free vertical motion of said shaft as required for the purpose of adjustment.

Figure 5:
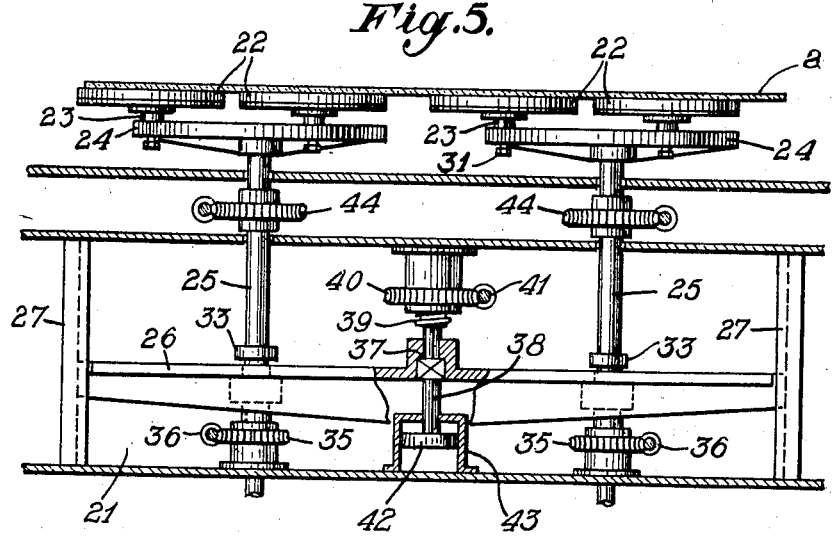
Fig. 5 is a side elevation, partly in section, showing a lower beam fitted with revolving tool-carrying support, in an apparatus for simultaneously polishing both sides of a glass sheet.
Figure 6:
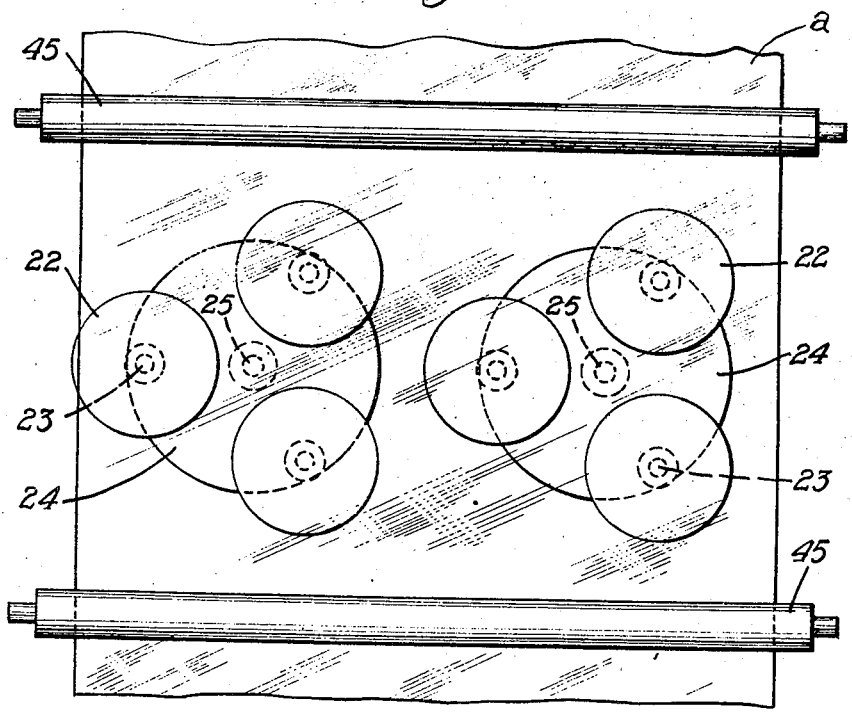
Fig. 6 is a top view of same.

Figs. 5 and 6 illustrate a lower beam 21 carrying two sets or groups of polishing tools 22 loosely mounted on shafts 23, the shafts 23 of each group being secured to a support 24 mounted on a rotatable shaft 25. Both shafts 25 rest on a cross bar 26 which is vertically adjustable in guides 27 provided in the beam 21.

With this arrangement three possibilities of adjustment are provided:

Each tool carrying shaft 23 is mounted in the rotatable support 24 by means of a sleeve 28 rotatably supported in ball or roller bearings 29 (Fig. 7). The shaft 23 is able to partake in the rotation of the sleeve 28 being connected therewith by a key 30 which permits of a vertical sliding motion of said shaft under the action of a supporting screw 31 engaged in the internally threaded lower portion of the sleeve 28.

Each support 24 is secured on the end of a vertical shaft 25 which is adapted to be rotated by a gear 44 (Fig. 5) slidably mounted thereon and rests on a roller bearing (Fig. 8) provided in the cup-shaped upper end of a threaded sleeve 34 screwed in the cross member 26. The lower part of sleeve 34 is slidably engaged in the hub of a helical wheel 35 controlled by a worm 36 mounted in the beam 21.

In turn, the cross member 26 slidably engaged in the vertical guides 27 rests on a collar 37 of a vertical supporting shaft 38 (Fig. 9) carried by and keyed to a threaded sleeve 39 in screw-threaded engagement with a helical wheel 40 controlled by a worm 41.

It is thus possible to bring to the same level the tools on each support 24 by operating the screws 31—to bring to the same level the tools of both supports 24 by operating the worms 36—and by operating the worm 41 to bring the tools of both supports 24 against the glass sheet to be polished, in the horizontal plane determined by the position of the driving rollers 45.

In Fig. 5, the lower end of shaft 38 is guided by a plunger 42 sliding in a cylinder. If desired the plunger 42 may be fluid controlled and used as a driving piston, to provide a hydraulic operating means in place of the mechanical control 40, 41. Likewise, hydraulic means may be provided to control the vertical movements of shafts 23 and 25 if desired.

In operation, the shafts 25 are rotated by the gears 44 driven from a motor (not shown) mounted in the beam 21. The tools 22 in contact with the lower face of the glass sheet a rotate about the shafts 25 and by their friction on the glass they are caused to rotate on their own shafts 23 in a well known manner.

The upper beam may be constructed in a similar manner as described in connection with the lower beam. As illustrated in Fig. 10 each tool shaft 25' carried by the upper beam 21' is then adapted to be rotated by a gear 5 slidably mounted thereon and rests on a roller bearing 33' provided in the cup-shaped upper end of a threaded sleeve 34' screwed in the slidable cross member 26'. The lower part of sleeve 34' is slidably engaged in the hub of a helical wheel 35' controlled by a worm 36' mounted in the beam 21'. The cross member 26' rests on a collar 37' of a vertical supporting shaft 38' carried by and keyed to a threaded sleeve 39' in screw-threaded engagement with a helical wheel 40' controlled by a worm 41'. The lower end of shaft 38' is guided by a plunger 42' sliding in a cylinder 43'. The plunger 42' may be fluid controlled and used as a driving piston, to provide a hydraulic operating means in place of the mechanical control 40', 41'.

The invention thus permits of compensating at any time the wear of the tools by a suitable adjustment and to keep the tools applied against both sides of the glass with equal pressures.

Figure 3:
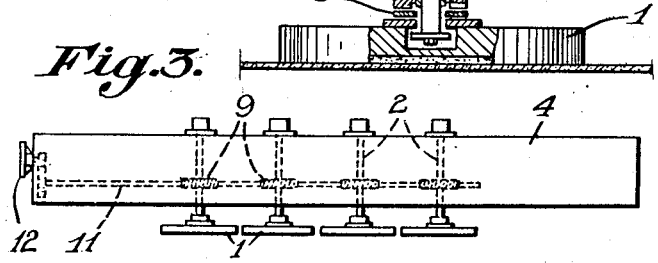
Figs. 3 and 4 are diagrammatical views in side elevation respectively showing means for adjusting the tools of an upper beam and of a lower beam.

It will be understood that when, as in Figs. 3 and 4, the working tools are arranged side by side in the carrying beam, their vertical shafts may advantageously be mounted in a cross member such as 26 in order to control the simultaneous adjustment of said tools.

I claim:

1. In apparatus for surfacing glass sheets, the combination of a carrying beam, at least two vertical shafts mounted in said beam, at least one surfacing tool carried by each of said shafts, each of said shafts comprising two vertically adjustable sections and an intermediate member, said intermediate member controlling the vertical adjustment of the section adjacent said tools, and means for controlling the adjustment of the section remote from said tools, said means being operatively connected with the last mentioned section in each of said shafts.

2. In apparatus for surfacing glass sheets, the combination of a carrying beam, at least two vertical shafts mounted in said beam, a cross member slidably mounted for up and down reciprocation in said beam, said shafts comprising each a rotary part and a screw-threaded part, at least one surfacing tool carried by each said rotary part, the screw-threaded part of each shaft being engaged in said cross member, means on said beam for rotating each of said screw-threaded parts, and means on said beam for raising and lowering said cross member.

3. In apparatus for surfacing glass sheets, the combination of a carrying beam, at least two vertical shafts mounted in said beam, means for rotating said shafts, a support on each of said shafts, rotary tools on each of said supports, a cross member on said beam carrying all said shafts, means for vertically adjusting the position of each tool with respect to its support, means for vertically adjusting the position of each of said shafts with respect to said cross member and means for vertically adjusting the position of said cross member with respect to said beam.

4. In apparatus for surfacing glass sheets, the combination of a carrying beam, at least two vertical shafts mounted in said beam, at least one surfacing tool carried by each of said shafts, an elastic ring interposed between each of said tools and its supporting shaft, means for rotating each of said shafts, means for separately adjusting the vertical position of each of said shafts, and means for simultaneously adjusting the vertical positions of all of said shafts.

5. In apparatus for surfacing glass sheets the combination of at least one lower carrying beam with at least one upper carrying beam, at least two vertical shafts mounted in each of said beams, said shafts being vertically adjustable, at least one surfacing tool carried by each of said shafts, the tools carried by the shafts mounted in the lower beam constituting the support of the glass sheet, means on each of said beams for rotating said shafts, means on said lower beam for separately controlling the vertical adjustment of each of the glass sheet supporting tool carrying shafts relatively to the lower beam, means on said lower beam for simultaneously controlling the vertical adjustment of all of the glass sheet supporting tool carrying shafts relatively to the lower beam, and means on said upper beam for simultaneously controlling the vertical adjustment of all its tool carrying shafts relatively to the upper beam.

6. In an apparatus for surfacing glass sheets the combination of at least one lower carrying beam with at least one upper carrying beam, at least two vertical shafts mounted in each of said beams, said shafts being vertically adjustable, at least one surfacing tool carried by each of said shafts, the tools carried by the shafts mounted in the lower beam constituting the support of the glass sheet, means on each of said beams for rotating said tool carrying shafts, means on each of said beams for separately controlling the vertical adjustment of each of the tool carrying shafts relatively to the respective beams, and means on said beams for simultaneously controlling the vertical adjustment of all of the tool carrying shafts relatively to the respective beams.

EDMOND LAVERDISSE.

References Cited in the file of this patent

UNITED STATES PATENTS

| Number | Name | Date |
| --- | --- | --- |
| 1,474,672 | Heuze | Nov. 20, 1923 |
| 1,782,475 | Merian et al. | Nov. 25, 1930 |
| 1,833,359 | Fox et al. | Nov. 24, 1931 |
| 2,273,624 | Campbell et al. | Feb. 17, 1942 |
| 2,341,524 | Bezborodko et al. | Feb. 15, 1944 |
| 2,402,293 | Nye | June 18, 1946 |
| 2,419,926 | Waldron | Apr. 29, 1947 |